(12) United States Patent
Hong et al.

(10) Patent No.: US 8,920,926 B2
(45) Date of Patent: Dec. 30, 2014

(54) PHOTOCATALYTIC COLORED ROOFING GRANULES

(75) Inventors: Keith C. Hong, Lititz, PA (US); Ming Liang Shiao, Collegeville, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 1966 days.

(21) Appl. No.: 12/057,495

(22) Filed: Mar. 28, 2008

(65) Prior Publication Data

US 2008/0241516 A1   Oct. 2, 2008

Related U.S. Application Data

(60) Provisional application No. 60/909,542, filed on Apr. 2, 2007.

(51) Int. Cl.
| | | |
|---|---|---|
| *B32B 15/02* | (2006.01) | |
| *B32B 5/16* | (2006.01) | |
| *E04D 13/00* | (2006.01) | |
| *C04B 20/10* | (2006.01) | |
| *E04D 7/00* | (2006.01) | |
| *B05D 3/02* | (2006.01) | |
| *B05D 7/00* | (2006.01) | |
| *C04B 111/20* | (2006.01) | |
| *C04B 111/00* | (2006.01) | |

(52) U.S. Cl.
CPC .............. *E04D 7/005* (2013.01); *E04D 13/002* (2013.01); *C04B 20/1074* (2013.01); *C04B 2111/2061* (2013.01); *C04B 2111/2092* (2013.01); *C04B 2111/00586* (2013.01)
USPC ........... 428/404; 427/190; 427/212; 427/215; 427/218; 427/219; 427/397.7; 428/331; 428/403

(58) Field of Classification Search
None
See application file for complete search history.

(56) References Cited

U.S. PATENT DOCUMENTS

| | | | |
|---|---|---|---|
| 2,591,149 | A | 4/1952 | Grove |
| 2,614,051 | A | 10/1952 | Buzzell et al. |
| 2,898,232 | A | 8/1959 | Miller et al. |
| 2,981,636 | A | 4/1961 | Lodge et al. |
| 3,507,676 | A | 4/1970 | McMahon |
| 5,356,664 | A | 10/1994 | Narayan et al. |
| 6,143,318 | A | 11/2000 | Gilchrist et al. |
| 6,204,214 | B1 | 3/2001 | Singh et al. |
| 6,294,247 | B1 | 9/2001 | Watanabe et al. |
| 6,303,229 | B2 * | 10/2001 | Takahama et al. ............ 428/447 |

(Continued)

OTHER PUBLICATIONS

Ramachandran, V.S.; Paroli, Ralph M.; Beaudoin, James J.; Delgado, Ana H. Handbook of Thermal Analysis of Construction Materials. William Andrew Publishing/Noyes, 2002. pp. 379-380. Online version available at: http://www.knovel.com/web/portal/browse/display?_EXT_KNOVEL_DISPLAY_bookid=603&VerticalID=0.*

*Primary Examiner* — Holly Le
*Assistant Examiner* — Thomas Mangohig
(74) *Attorney, Agent, or Firm* — Paul & Paul

(57) ABSTRACT

Algae-resistant roofing granules include a mineral core and an exterior coating including clay, colloidal silica, phosphate, a metal oxide, and a photocatalytic particulate having an average size under 100 nm. By varying the proportions of the components to the binder for the exterior coating, improved control of the pot life of the coating composition can be achieved, and the binder can be formulated to accommodate different manufacturing conditions.

21 Claims, 1 Drawing Sheet

(56) References Cited

U.S. PATENT DOCUMENTS

| | | |
|---|---|---|
| 6,569,520 B1 | 5/2003 | Jacobs |
| 6,881,701 B2 | 4/2005 | Jacobs |
| 2001/0006933 A1* | 7/2001 | Nagasaki et al. ............ 502/239 |
| 2003/0190431 A1* | 10/2003 | Jacobs ....................... 427/397.8 |
| 2005/0229809 A1* | 10/2005 | Lally .......................... 106/18.14 |
| 2005/0266235 A1* | 12/2005 | Nakajima et al. ............. 428/336 |
| 2005/0277543 A1 | 12/2005 | Takahashi et al. |
| 2006/0014050 A1 | 1/2006 | Gueneau et al. |

* cited by examiner

PHOTOCATALYTIC COLORED ROOFING GRANULES

CROSS-REFERENCE TO RELATED APPLICATION

The present application claims the priority of U.S. Provisional Patent Application 60/909,542 filed Apr. 2, 2007.

BACKGROUND OF THE INVENTION

1. Field of the Invention

The present invention relates to asphalt roofing shingles, protective granules for such shingles, and processes for making such granules and shingles.

2. Brief Description of the Prior Art

Pigment-coated mineral rocks are commonly used as color granules in roofing applications to provide aesthetic as well as protective functions to the asphalt shingles. Roofing granules typically include a core formed by crushed and screened mineral materials, which are subsequently coated with one or more color coating layers comprising a binder in which is dispersed one or more coloring pigments, such as suitable metal oxides. Inorganic binders are typically employed. The binder can be a soluble alkaline silicate that is subsequently insolubilized by heat or by chemical reaction, such as by reaction between an acidic material and the alkaline silicate, resulting in an insoluble colored coating on the mineral particles. The coating layer may also include additives for long term outdoor durability and functionality.

When an alkali metal-silicate binder such as sodium silicate is employed in the preparation of algae-resistant granules, the binder can include a heat-reactive aluminosilicate material, such as clay, for example, kaolin clay. Alternatively, it is possible to insolubilize the metal silicate binder chemically by reaction with an acidic material, for example, ammonium chloride, aluminum chloride, hydrochloric acid, calcium chloride, aluminum sulfate, and magnesium chloride, such as disclosed in U.S. Pat. Nos. 2,591,149, 2,614,051, 2,898,232 and 2,981,636, or other acidic material such as aluminum fluoride. The binder can also be a controlled release sparingly water soluble glass such as a phosphorous pentoxide glass modified with calcium fluoride, such as disclosed in U.S. Pat. No. 6,143,318. The most commonly used binder is a mixture of an alkali metal silicate and an alumino-silicate clay material.

Although inexpensive, coating binders prepared from mixtures of an alkali metal silicate and an alumino-clay material have drawbacks. In particular, the pot life of coating compositions including such binders depends significantly on the humidity and ambient temperature.

Dark blotches or streaks sometimes appear on the surfaces of asphalt shingles, especially in warmer humid climates, because of the growth of algae and other microorganisms. The predominant species responsible is *Gloeocapsa* sp, a blue-green algae. Other microbial growth, including fungi, moss and lichen, can also occur under proper conditions, for example, in a shady and/or persistently damp environment. In addition to being aesthetically unpleasant, the discoloration can lead to heat buildup and accelerate premature roofing failure. Eventually, severe discoloration of the entire roof can occur.

Various methods have been used in an attempt to remedy the roofing discoloration. Washing the roof surfaces with dilute cleaning solutions containing a strong oxidizer such as bleach can remove the algae from roofs. However, frequent washing and cleaning with cleaning solutions is required, since the effective duration of such treatments is rather short. In addition, topical treatments with organic algaecides have been used. However, such topical treatments are also usually effective only for short term, typically one to two years.

If the freshly cleaned surfaces are treated with a coating containing some form of biocides, the antimicrobial properties could remain for a longer period of time, between five to seven years. To prevent algal growth, various types of biocides have been used. The most commonly used biocides are metals and inorganic metal oxides, such as, for example zinc metal granules and copper oxide-coated granules. However, these biocides typically persist for around ten years, and in some limited cases, for periods approaching fifteen years. One drawback is these compounds are effective against only one microbe, *Gloeocapsa* sp. At the same time, the service life of roofing products can extend considerably longer than ten to fifteen years, depending on the composition and structure of the roofing materials employed to construct the roof.

Increased public awareness of algae infestation on roofing shingles has led to higher demand for products that provide algae resistance. Algae infestation on roofing shingles can cause severe discoloration to the roof and is therefore highly undesirable to homeowners. In addition, the discoloration leads to darkened color on the roof and hence can have undesirable effects for increasing solar heat absorption. Some roofing manufacturers would carry only algae resistant (AR) shingles in their product lines, and even for regions that were once considered non-algae prone such as the Northeast and the Great Lakes areas. Furthermore, environmental friendly products that would not pollute the ecosystem are also more attractive.

Companies, including Minnesota Mining and Manufacturing (3M Company) and ISP Mineral Products Inc., have commercialized several algaecidal granules that are effective in inhibiting algae growth.

A common method used to prepare algae-resistant roofing granules generally involves two major steps. In the first step, metal oxides such as cuprous oxide and/or zinc oxide are added to a clay and alkali metal silicate mixture. The mixture in turn is used to coat crushed mineral rocks. The mixture is rendered insoluble on the rock surfaces by firing at high temperatures, such as about 500 degrees C., to provide a ceramic coating. In the second step, the oxide covered rocks are coated with various color pigments to form colored algae-resistant roofing granules. The algae-resistant granules, alone, or in a mixture with conventional granules, are then used in the manufacture of asphalt shingles using conventional techniques. The presence of the algae-resistant granules confers algae-resistance on the shingles.

Algae resistant shingles are disclosed, for example, in U.S. Pat. No. 5,356,664 assigned to Minnesota Mining and Manufacturing Co., which discloses the use of a blend of algae-resistant granules and non-algae-resistant granules. The algae-resistant granules have an inner ceramic coating comprising cuprous oxide and an outer seal coating initially devoid of copper. U.S. Pat. No. 3,507,676 discloses roofing granules containing zinc, zinc oxide, or zinc sulfide, as an algaecide and fungicide.

Roofing granules containing cuprous oxide have been used as algae resistant (AR) granules since the mid-1990's. Photocatalytic coatings containing anatase nano-titanium oxide have been reported for construction materials and sanitary ware in different applications including self-cleaning, anti-fogging, and anti-bacterial material, such as disclosed in U.S. Pat. No. 6,294,247, U.S. Patent Publication 2005-0277543 A1, and U.S. Patent Publication 2006-0014050 A1. Coating compositions consisting of an alkali metal silicate binder and photocatalytic particles have been described as possessing anti-algal properties in building materials, as disclosed in U.S. Pat. No. 6,569,520 and U.S. Pat. No. 6,881,701. Phosphate-bonded ceramic binders have been developed for encasing hazardous wastes, such as disclosed in U.S. Pat. No. 6,204,214. Also, field-applied clear coatings containing biocides have been used to prevent algae infestation on shingles.

There is a need for a curable binder composition for roofing granules that permits a flexible adjustment of cure rate and cure time. In addition, there is a need for a binder composition that can be formulated to meet different manufacturing conditions. There is also a need for a binder with reduced dependence on the temperature and humidity of the manufacturing environment.

In addition, there is a continuing need for algae-resistant roofing products that that do not leach out metal species (such as copper or zinc ions) or organic biocides. At the same time, there is a continuing need for roofing granules that provide effective algaecidal properties and algae resistance to roofing products, preferably over extended periods of time.

SUMMARY OF THE INVENTION

The present invention provides an inorganic binder for coating compositions for roofing granules that provides for improved control of the pot life of the coating composition. In one aspect, the binder of the present invention preferably includes at least four components: colloidal silica, clay, aluminum phosphate and metal oxide.

In another aspect, the binder of the present invention includes at least two components, a phosphate and at least one additional component selected from the group consisting of colloidal silica, clay and metal oxide.

By varying the proportion of the components, the binder can be formulated to accommodate different manufacturing conditions. In another aspect, the present invention provides an inorganic binder for coating compositions further including particulates of very small particle size, such as nano materials of less than 100 nm in diameter. The present invention advantageously permits a higher loading of very small particulates than possible with conventional binder compositions, without excessive thickening of the binder composition.

Depending on the specific composition of the coating composition of the present invention, the present invention also provides for roofing granules having unique properties and characteristics, such as self-cleaning exterior surfaces and algae-resistance without excessive release of metal ion into the environment. Suitable materials for use in preparing the roofing granules of the present invention include photocatalytic nano-titanium oxide, nano-copper oxide, and nano-zinc oxide.

The present invention also provides a sheet-roofing product, such as asphalt roof shingles or roofing membranes. In one aspect, a sheet-roofing product according to the present invention includes a bituminous base and algae-resistant roofing granules according to the present invention.

Thus, in one aspect, the present invention provides algae-resistant roofing granules, algae-resistant sheet roofing products such as asphalt shingles and roofing membranes, and processes for make such granules and products. In a different aspect, the present invention provides self-cleaning roofing granules, self-cleaning sheet roofing products such as asphalt shingles and roofing membranes, and process for making such granules and products.

In a first aspect, the present invention provides algae-resistant roofing granules comprising a base particle, such as a mineral core, and an exterior coating covering the base particle. In this aspect, the exterior coating comprises a binder comprising clay, colloidal silica, at least one phosphate, at least one metal oxide. The exterior coating further comprises at least one photocatalytic particulate. The at least one photocatalytic particulate preferably has an average particle diameter less than about 100 nm.

Preferably, an exterior coating composition of the present invention is applied to the exterior surface of base particles to form an exterior coating layer with a thickness of from about 5 micrometers to about 200 micrometers, and more preferably a thickness of from about 12.5 micrometers to about 40 micrometers.

Preferably, in this first aspect of the algae-resistant roofing granules the clay comprises from about 20 to 40% by weight of the exterior coating. Preferably, in the algae-resistant roofing granules of the present invention, the clay is selected from the group consisting of kaolin, ball clay, and bentonite, to name a few.

Preferably, in this first aspect of the algae-resistant roofing granules, the colloidal silica comprises from about 25 to 60% by weight of the exterior coating.

It is preferred in this first aspect of the algae-resistant roofing granules, that the at least one phosphate comprises from about 5 to 30% by weight of the exterior coating. Preferably, the at least one phosphate is selected from the group consisting of salts of phosphorous oxo anions. More preferably, the at least one phosphate is selected from the group consisting of aluminum phosphate, potassium phosphate, potassium hydrogen phosphate, potassium dihydrogen phosphate, calcium phosphate, calcium hydrogen phosphate, calcium dihydrogen phosphate, magnesium phosphate, magnesium hydrogen phosphate, sodium phosphate, sodium hydrogen phosphate, and sodium dihydrogen phosphate. In particular, it is presently preferred that the at least one phosphate is selected from the group consisting of aluminum phosphate, potassium phosphate, calcium phosphate, magnesium phosphate, and sodium phosphate.

Further, in this first aspect of the algae-resistant roofing granules, the at least one metal oxide preferably comprises from about 15 to 35 percent by weight of the exterior coating, and more preferably about 20 to 30 percent by weight of the exterior coating. It is preferred in this aspect of the algae-resistant roofing granules of the present invention that the at least one metal oxide be selected from the group consisting of alkali earth metal oxides, oxides of first row transition metals, and oxides of second row transition metals. Preferably, the at least one metal oxide is selected from the group consisting of magnesium oxide, calcium oxide, iron oxide, copper oxide, zinc oxide, magnesium oxide, cobalt oxide, zirconium oxide and molybdenum oxide.

In addition, in the algae-resistant roofing granules of the present invention, the at least one photocatalytic particulate is preferably a metal oxide comprising from about 0.1 to 20% by weight of the exterior coating. Moreover, it is preferred that the at least one photocatalytic particulate have an average particle size of from 1 nm to 60 nm as determined by light scattering. Preferably, the at least one photocatalytic particulate is selected from the group consisting of photocatalytic titanium oxide, photocatalytic copper oxide, photocatalytic vanadium oxide, and photocatalytic zinc oxide.

Preferably, in the algae-resistant roofing granules according to the present invention, the mineral core has an average particle size of from about 0.4 mm to about 2.0 mm, as determined by sieve analysis. Preferably, in the algae-resistant roofing granules of the present invention, the mineral core is selected from the group consisting of crushed rock and agglomerated mineral particles.

The present invention also provides roofing shingles comprising algae-resistant roofing granules according to the present invention.

In a second aspect, the present invention provides self-cleaning roofing granules comprising a mineral core; and an exterior coating covering the mineral core; wherein the exterior coating comprises clay, at least one phosphate, at least one metal oxide, and at least one photocatalytic particulate effective to photocatalytically degrade organic compounds that contact the exterior coating.

The present invention also provides roofing shingles comprising self-cleaning roofing granules according to this second aspect of the present invention.

In yet another aspect, the present invention provides roofing granules comprising a mineral core and an exterior coating covering the mineral core. In this third aspect of the roofing granules of the present invention, the exterior coating comprises a chemically bonded cement, preferably, a chemically bonded phosphate cement. Preferably in this aspect of the roofing granules of the present invention, the exterior coating composition also includes at least photocatalytic particulate, preferably at least one photocatalytic metal oxide. It is preferred in this aspect that the exterior coating comprise a chemically bonded phosphate cement prepared from a cementitious exterior coating composition including at least one metal oxide or a metal hydroxide slightly soluble in an acidic aqueous solution to provide metal cations and a source of phosphate anions. Preferably, the relative quantities of the at least one metal oxide or metal hydroxide and at least one source of phosphate anion are selected to provide a cured coating having a neutral pH, the coating composition being cured by the acid-base reaction of the at least one metal oxide or hydroxide and the source of phosphate anions. Preferably, in this aspect the exterior coating composition comprises at least one metal oxide or metal hydroxide as a source of metal cations and at least one phosphate. Preferably, at least one metal oxide or metal hydroxide comprises at least one clay. Preferably, the exterior coating composition further includes colloidal silica.

Preferably, the exterior coating composition is applied to the exterior surface of mineral core particles to form an exterior coating layer with a thickness of from about 5 micrometers to about 200 micrometers, and more preferably a thickness of from about 12.5 micrometers to about 40 micrometers.

Preferably, in this third aspect of the roofing granules of the present invention, the at least one metal oxide or metal hydroxide is selected from the group consisting of alkali earth metal oxides, alkaline earth hydroxides, aluminum oxide, oxides of first row transition metals, hydroxides of first row transition metals, oxides of second row transition metals, and hydroxides of second row transition metals. More preferably, in this aspect of the roofing granules of the present invention, the at least one metal oxide or metal hydroxide is selected from the group consisting of magnesium oxide, calcium oxide, iron oxide, copper oxide, zinc oxide, aluminum oxide, cobalt oxide, zirconium oxide and molybdenum oxide. Preferably, the at least one metal oxide or metal hydroxide is sparingly soluble in an acidic aqueous solution. In addition, it is preferred that the at least one metal oxide or metal hydroxide comprise from about 10 to 30% by weight of the exterior coating.

Preferably, in this aspect of the present invention, the at least one phosphate is selected from the group consisting of phosphoric acid and acid phosphate salts. More preferably, the at least phosphate is selected from the group consisting of phosphoric acid, and acid salts of phosphorous oxo anions, and especially salts including at least one cation selected from the group consisting of ammonium, calcium, sodium, potassium, and aluminum cations. In particular, it is preferred that the at least one phosphate be selected from the group consisting of phosphoric acid, ammonium hydrogen phosphate, ammonium dihydrogen phosphate, potassium hydrogen phosphate, potassium dihydrogen phosphate, potassium phosphate, calcium hydrogen phosphate, calcium dihydrogen phosphate, magnesium hydrogen phosphate, sodium hydrogen phosphate, sodium dihydrogen phosphate, aluminum hydrogen phosphate, aluminum dihydrogen phosphate, and mixtures thereof. Commercial grades of calcium phosphate salts, such "NSP" (normal super phosphate) and "TSP" (triple super phosphate) can also be used. Potassium dihydrogen phosphate ("monopotassium phosphate"), aluminum hydrophosphate ($AlH_3(PO_4).2H_2O$), monoaluminum phosphate ($Al(H_2PO_4)_3$) and magnesium dihydrogen phosphate are especially preferred. Preferably, the at least one phosphate comprises from about 10 to 60% by weight of the exterior coating.

The at least one photocatalytic particulate of the exterior coating preferably has an average particle diameter less than about 100 nm. Preferably, the at least one photocatalytic particulate has an average particle size of from about 1 nm to about 60 nm, as determined by a light scattering method. In addition, it is preferred that the least one photocatalytic particulate comprises from about 0.1 to 20% by weight of the exterior coating. Preferably, the at least one photocatalytic particulate is photocatalytic metal oxide. Preferably the photocatalytic metal oxide is selected from the group consisting of photocatalytic titanium oxide, photocatalytic copper oxide, photocatalytic vanadium oxide, and photocatalytic zinc oxide. Photocatalytic titanium dioxide, and in particular anatase titanium dioxide, is especially preferred.

Preferably, in this aspect of the roofing granules of the present invention, the chemically bonded cement comprises from about 30 to 80 percent by weight of the exterior coating. Preferably, the at least one metal oxide or metal hydroxide comprises from about 10 to 30 percent by weight of the chemically bonded cement.

Preferably, in this aspect of the roofing granules of the present invention the at least one clay comprises from about 10 to 40% by weight of the exterior coating. Preferably, the colloidal silica comprises from about 5 to 30% by weight of the exterior coating.

In another aspect, the present invention provides a process for making roofing granules resistant to algal growth. In this aspect, the process of the present invention comprises combining clay, at least one phosphate, at least one metal oxide, and at least one photocatalytic particulate to form an exterior coating composition, the at least one photocatalytic particulate having an average particle diameter less than about 100 nm. The process further comprises applying the coating composition to an aggregate material having an exterior surface, so that the exterior surface is coated at least in part by the exterior coating composition to form coated aggregate. The process further includes curing the exterior coating composition to form a photocatalytic coating on the aggregate material.

Preferably, in the present aspect of the process of the present invention, the exterior coating composition is applied to the exterior surface of mineral core particles to form an exterior coating layer with a thickness of from about 5 micrometers to about 200 micrometers, and more preferably a thickness of from about 10 micrometers to about 40 micrometers.

Preferably, in the present process the exterior coating composition further comprises colloidal silica. Preferably, in the present process the colloidal silica comprises from about 15 to 50 percent by weight of the exterior coating composition. Preferably, in the present process the colloidal silica prior to addition to the binder has a solids content by weight of from about 25% to 60%. Preferably, in the present process the colloidal silica prior to addition to the binder has a pH of about 7.5 to 10.5.

Preferably, in the present process the clay comprises from about 20 to 60% by weight of the exterior coating composition. Preferably, in the present process the clay is selected from the group consisting of kaolin, ball clay, and bentonite.

Preferably, in the present process, the at least one phosphate comprises from about 20 to 80% by weight of the exterior coating composition. Preferably, in the present process the at least one phosphate is selected from the group consisting of salts of phosphorous oxo anions. More preferably, the at least one phosphate is selected from the group consisting of aluminum phosphate, potassium phosphate, potassium hydrogen phosphate, potassium dihydrogen phosphate, calcium phosphate, calcium hydrogen phosphate, calcium dihydrogen phosphate, magnesium phosphate, magnesium hydrogen phosphate, sodium phosphate, sodium hydrogen phosphate, and sodium dihydrogen phosphate. It is especially preferred in the present process that the at least one phosphate be selected from the group consisting of aluminum phosphate, potassium phosphate, calcium phosphate, magnesium phosphate, and sodium phosphate.

Preferably, in the present process the at least one metal oxide comprises from about 10 to 30% by weight of the exterior coating. Preferably, in the present process the at least one metal oxide is selected from the group consisting of alkali earth metal oxides, oxides of first row transition metals, and oxides of second row transition metals. More preferably, in the present process the at least one metal oxide is selected from the group consisting of magnesium oxide, calcium oxide, iron oxide, copper oxide, zinc oxide, cobalt oxide, zirconium oxide and molybdenum oxide.

Preferably, in the present process the at least one photocatalytic particulate is a metal oxide comprising from about 0.1 to 20% by weight of the exterior coating. Preferably, in the present process the at least one photocatalytic particulate has an average particle size of from 1 nm to 60 nm, as determined by a light scattering method. Preferably, in the present process the at least one photocatalytic particulate is selected from the group consisting of photocatalytic titanium oxide, photocatalytic copper oxide, photocatalytic vanadium oxide, and photocatalytic zinc oxide.

Preferably, in the present process the mineral core has an average particle size of from about 0.4 mm to about 2.0 mm, as determined by sieve analysis. Preferably, in the present process the mineral core is selected from crushed rock and agglomerated mineral particles.

Preferably, in the present process, the coated roofing granules are heated in a rotary kiln to cure the coating composition.

In yet another aspect, the present invention also provides a process for making roofing granules resistant to algal growth. In this aspect, the process of the present invention comprises combining at least one metal oxide and at least one phosphate, and optionally at least one clay, with at least one photocatalytic particulate to form a coating composition, with the at least one photocatalytic particulate having an average particle diameter less than about 100 nm. In this aspect, the process further comprises applying the coating composition to aggregate having an exterior surface, so that the exterior surface is coated at least in part by the binder to form coated aggregate. The process further comprises heating the coated aggregate and converting the coating composition to a coating. Preferably, the photocatalytic coating provides a high photocatalytic effectiveness for an extended period of time, on the order of the service life of the roofing granules. Preferably, the process further comprises combining colloidal silica to the binder prior to applying the binder to the exterior surface of the aggregate. In the present process, the colloidal silica prior to addition to the binder preferably has a solids content by weight of from about 25% to 60%. Preferably, the colloidal silica prior to addition to the binder has a pH of about 7.5 to 10.5. Preferably, the coated roofing granules are heated in a rotary kiln.

In another aspect, the present invention provides sheet roofing products including roofing shingles comprising algae-resistant roofing granules according to the present invention.

The algae-resistant granules prepared according to the process of the present invention can be employed in the manufacture of algae-resistant roofing products, such as algae-resistant asphalt shingles or roofing membranes. The algae-resistant granules of the present invention can be mixed with conventional roofing granules, and the granule mixture can be embedded in the surface of bituminous roofing products using conventional methods. Alternatively, the algae-resistant granules of the present invention can be substituted for conventional roofing granules in manufacture of bituminous roofing products, such as asphalt roofing shingles, to provide those roofing products with algae-resistance.

It is an object of the present invention to provide an improved exterior coating composition for roofing granules.

It is an object of the present invention to provide a process for preparing roofing granules that consumes less energy than conventional processes.

It is an object of the present invention to provide algae-resistant roofing granules that release substantially reduced levels of metal ions into the environment.

It is an object of the present invention to provide algae-resistant roofing granules that have self-cleaning surfaces.

It is an object of the present invention to provide roofing granules with a durable surface coating.

These and other objects of the invention will become apparent through the following description and claims.

DETAILED DESCRIPTION

In one aspect, the present invention provides an improved inorganic binder for coating compositions for roofing granules that provides for enhanced formulation latitude and better control of the pot life of the coating composition. In another aspect, the present invention provides algae-resistant roofing granules, algae-resistant sheet roofing products such as asphalt shingles or roofing membranes, and processes for make such granules and products. In another aspect, the present invention provides for self-cleaning roofing granules, self-cleaning sheet roofing products, and processes for making such granules and products.

Roofing granules typically include a mineral core covered with an exterior coating. The exterior coating is usually prepared by curing a coating composition that includes an inorganic binder. Color pigments, such as metal oxides, are dispersed in the inorganic binder. Other additives for long term outdoor durability and functionality may also be included. The coating composition is typically cured at an elevated temperature to provide a ceramic coating on the mineral core. The most common binder is composed of alkali metal silicate and alumino-silicate clay material. However, the pot life of such binders during processing depends greatly on the ambient humidity and temperature. The present invention advantageously provides an inorganic binder that allows control of the pot life at will. In one presently preferred embodiment, the binder of the present invention preferably includes four components: colloidal silica, clay, aluminum phosphate and metal oxide. In another presently preferred embodiment of the present invention, the binder of the present invention includes at least two components, a phosphate and at least one additional component selected from the group consisting of colloidal silica, clay and metal oxide. By varying the proportion of these components, the binder can be custom designed to accommodate different manufacturing conditions.

The binder of present invention is particularly useful when formulating exterior coating compositions that include particulates of very small particle size, such as nano materials of less than 100 nm in diameter. The addition of very fine particulates tends to thicken the coating composition, even at relatively small loadings. At the same time the binder must be kept sufficiently fluid to be easily applied to the mineral cores, and to form a uniform coating. The composition of the binder of the present invention can be adjusted so that the resulting coating composition remains workable even when very fine particulates are included in the coating composition.

Figure 1:
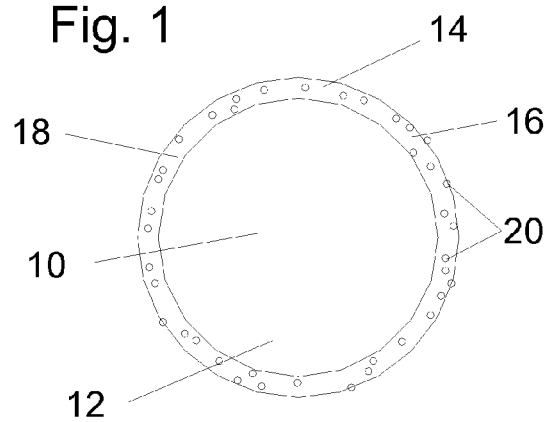
FIG. 1 is a schematic representation of a roofing granule according to a first embodiment of the present invention.
Figure 2:
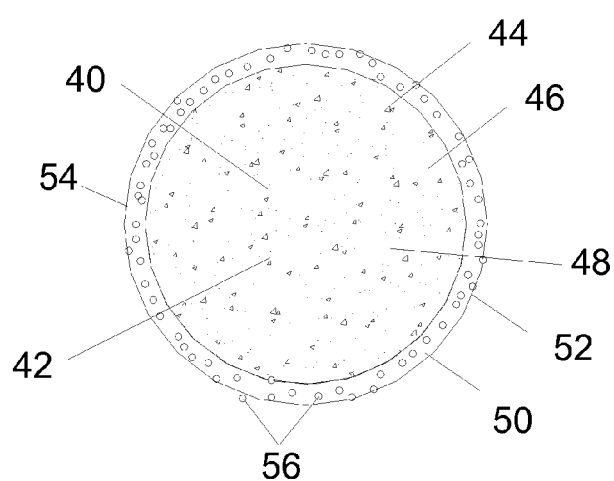
FIG. 2 is a schematic representation of a roofing granule according to a second embodiment of the present invention.
Figure 3:
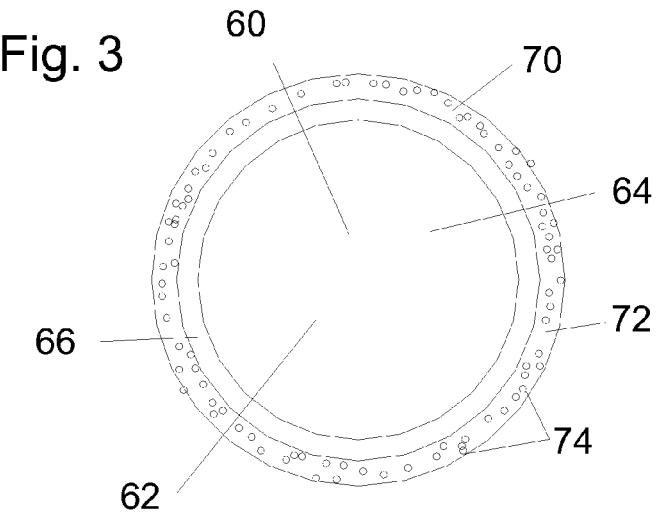
FIG. 3 is a schematic representation of a roofing granule according to a third embodiment of the present invention.

Referring now to the drawings, in which like reference numerals refer to like elements in each of the several view, there are shown schematically in FIGS. 1, 2, and 3 examples of roofing granules prepared according to the process of the present invention.

FIG. 1 is a schematic representation of a first type of a roofing granule of the present invention. FIG. 1 schematically illustrates a roofing granule 10 formed from a base particle 12 comprising a mineral core particle covered with a coating layer 14 composed of a coating composition 16 including a binder 18 according to the present invention and photocatalytic oxide particles 20 dispersed in the binder 18. Depending on the composition, amount, size, and distribution of the photocatalytic oxide particles 20, the resulting roofing granules 10 can have algaecidal effectiveness, self-cleaning properties, or both.

FIG. 2 is a schematic representation of a second type of an algae-resistant granule of the present invention. FIG. 2 schematically illustrates an algae-resistant granule 40 formed from a base particle 42 comprising a composite material 44 including an aggregate 46 dispersed in a binder 48. The base particle 42 is covered with a coating layer 50 comprising a coating composition 52 including a binder 54 and photocatalytic metal oxide particles 56 dispersed in the binder 54. Depending on the composition, amount, size, and distribution of the photocatalytic oxide particles 56, the resulting roofing granule 40 can have algaecidal effectiveness, self-cleaning properties, or both.

FIG. 3 is a schematic representation of a third type of an algae-resistant granule of the present invention. FIG. 3 schematically illustrates an algae-resistant granule 60 formed from a base particle 62 comprising an inert mineral core particle 64 covered with an inner coating layer 66 formed from a first coating composition. The first or inner coating composition can be a conventional roofing granule coating composition based on an alkali metal silicate-aluminosilicate clay binder, or, preferably a coating composition including a binder according to the present invention. The inner coating layer 66 is in turn covered with an outer coating layer 70 formed from a second coating composition including a binder 72 according to the present invention and photocatalytic metal oxide particles 74. Depending on the composition, amount, size, and distribution of the photocatalytic oxide particles 74, the resulting roofing granule 60 can have algaecidal effectiveness, self-cleaning properties, or both.

The base particles employed in the process of preparing the roofing granules of the present invention can take several forms.

In one presently preferred embodiment, the base particles are inert core particles. In another embodiment, the base particles are prepared using inert core particles, which are subsequently coated with a first or inner coating composition material to form a first or inner layer on the core particles.

The core particles employed in either embodiment are preferably chemically inert materials, such as inert mineral particles, solid or hollow glass or ceramic spheres, or foamed glass or ceramic particles. Suitable mineral particles can be produced by a series of quarrying, crushing, and screening operations, are generally intermediate between sand and gravel in size (that is, between about #8 US mesh and #70 US mesh). Preferably, the core particles have an average particle size of from about 0.2 mm to about 3 mm, and more preferably from about 0.4 mm to about 2.4 mm.

In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as manufactured materials such as ceramic grog and proppants, and recycled manufactured materials such as crushed bricks, concrete, porcelain, fire clay, and the like.

Solid and hollow glass spheres are available, for example, from Potters Industries Inc., P.O. Box 840, Valley Forge, Pa. 19482-0840, such as SPHERIGLASS® solid "A" glass spheres product grade 1922 having a mean size of 0.203 mm, product code 602578 having a mean size of 0.59 mm, BALLOTINI impact beads product grade A with a size range of 600 to 850 micrometers (U.S. Seive size 20-30), and QCEL hollow spheres, product code 300 with a mean particle size of 0.090 mm. Glass spheres can be coated or treated with a suitable coupling agent if desired for better adhesion to the binder of the inner coating composition.

In preparing roofing granules according to one embodiment of the process of the present invention, intermediate or base particles can be formed by coating the inert core particles with a first or inner coating composition to form at least one first or inner layer on the inert core particles, and to thus at least partially encapsulate the inert core particles. The inner coating composition includes a suitable coating binder. The coating binder can be an inorganic material, such as a metal-silicate binder, for example an alkali metal silicate, such as sodium silicate. Preferably, however, the inner coating composition includes a binder according to the present invention. Suitable inert core particles, for example, mineral particles with size passing #8 US mesh and retaining on #70 US mesh, can be coated with an inner coating composition including an alkali metal silicate, kaolin clay, and, optionally, color pigments such as metal oxide pigments to reach desirable colors, followed by a heat treatment to obtain a durable inner layer or coating.

When the base particles include an inner coating layer covering a mineral core and are fired at an elevated temperature, such as at least about 400 degrees C., and preferably at about 500 to about 650 degrees C., to cure the alkali metal silicate-clay binder, the binder densifies to form a ceramic inner coating layer on the mineral core. Examples of clays that can be employed in the process of the present invention include kaolin, other aluminosilicate clays, ball clay, Dover clay, bentonite clay, etc. In the alternative, a suitable silicaceous or siliceous binder can be formed from sodium silicate, modified by the addition of at least one of sodium fluorosilicate, aluminum fluoride, boric acid or Portland cement.

In a first aspect, the present invention provides roofing granules comprising a base particle, such as a mineral core, and an exterior coating covering the base particle. In this first aspect, the exterior coating comprises a phosphate binder comprising clay, colloidal silica, at least one phosphate, and at least one metal oxide. Preferably, the exterior coating composition also includes at least one photocatalytic particulate, and the at least one photocatalytic particulate preferably has an average particle diameter less than about 100 nm.

Preferably, the exterior coating composition of the present invention is applied to the exterior surface of base particles to form an exterior coating layer with a thickness of from about 5 micrometers to about 200 micrometers, and more preferably a thickness of from about 10 micrometers to about 40 micrometers.

Preferably, in one aspect of the present the phosphate binder includes clay which comprises from about 20 to 40% by weight of the exterior coating. Preferably, in this aspect of the present invention, the clay is selected from the group consisting of kaolin, ball clay, and bentonite.

Preferably, in this aspect of the present invention the phosphate binder, the colloidal silica comprises from about 25 to 60% by weight of the exterior coating.

In this aspect of the present invention, it is preferred that the at least one phosphate comprises from about 5 to 30% by weight of the exterior coating.

Preferably, in the present invention, the at least one phosphate is selected from the group consisting of phosphoric acid and salts of phosphorous oxo anions. More preferably, the at least one phosphate is selected from the group consisting of phosphoric acid, aluminum phosphate, potassium phosphate, potassium hydrogen phosphate, potassium dihydrogen phosphate, calcium phosphate, calcium hydrogen phosphate, calcium dihydrogen phosphate, magnesium phosphate, magnesium hydrogen phosphate, sodium phosphate, sodium hydrogen phosphate, and sodium dihydrogen phosphate. In particular, it is presently preferred that the at least one phosphate is selected from the group consisting of aluminum phosphate, potassium phosphate, calcium phosphate, magnesium phosphate, and sodium phosphate.

Further, in this aspect of the present invention, the at least one metal oxide preferably comprises from about 10 to 30% by weight of the exterior coating. It is preferred in this aspect that the at least one metal oxide be selected from the group consisting of alkali earth metal oxides, oxides of first row transition metals, and oxides of second row transition metals. Preferably, the at least one metal oxide is selected from the group consisting of magnesium oxide, calcium oxide, iron oxide, copper oxide, zinc oxide, cobalt oxide, zirconium oxide and molybdenum oxide.

Preferably, in this first aspect of roofing granules according to the present invention, the exterior coating composition is cured by heating the coated roofing granules at an elevated temperature until the coating composition cures and densifies to a ceramic material. The temperature and duration of the cure depends upon the composition of the phosphate binder. Preferably, the exterior coating composition including the phosphate binder is cured by heating the roofing granules at a temperature of at least 400 degrees C. for at least 25 minutes. More preferably, the exterior coating composition is cured by heating the roofing granules at a temperature of at least 500 degrees C. for at least 20 minutes.

In another aspect, the present invention also provides a process for making roofing granules resistant to algal growth. In this aspect, the process of the present invention comprises combining at least one metal oxide and at least one phosphate, and optionally at least one clay, with at least one photocatalytic particulate to form a coating composition, with the at least one photocatalytic particulate having an average particle diameter less than about 100 nm. In this aspect, the process further comprises applying the coating composition to core particles having an exterior surface, so that the exterior surface is coated at least in part by the binder to form coated core particles. The process further comprises heating the coated core particles and converting the coating composition to a coating. Preferably, the photocatalytic particulate is selected to provide the photocatalytic coating with a high photocatalytic effectiveness, Preferably, the process further comprises combining colloidal silica to the binder prior to applying the binder to the exterior surface of the aggregate. In the present process, the colloidal silica prior to addition to the binder preferably has a solids content by weight of from about 25% to 60%. Preferably, the colloidal silica prior to addition to the binder has a pH of about 7.5 to 10.5. Preferably, the coated roofing granules are heated in a rotary kiln.

In yet another aspect, the present invention also provides roofing granules comprising a mineral core and an exterior coating covering the mineral core. However, in this aspect, the binder for the exterior coating comprises a chemically bonded cement, preferably, a chemically bonded phosphate cement.

In this aspect of the roofing granules of the present invention, the binder for the exterior coating comprises a chemically bonded phosphate cement prepared from a cementitious exterior coating composition.

In one presently preferred embodiment, the chemically bonded phosphate cement is selected from the group consisting of phosphoric acid and acid salts of phosphorous oxo anions, with monoaluminum phosphate being especially preferred.

In another embodiment, the chemically bonded phosphate cement includes at least one metal oxide or a metal hydroxide slightly soluble in an acidic aqueous solution to provide metal cations and a source of phosphate anions or a metal phosphate salt such as aluminum phosphate. The relative quantities of the at least one metal oxide or metal hydroxide and at least one source of phosphate anion can be selected to provide a cured coating having a neutral pH, the coating composition being cured by the acid-base reaction of the at least one metal oxide or hydroxide and the source of phosphate anions. Preferably, in this embodiment the binder of the exterior coating composition comprises at least one metal oxide or metal hydroxide as a source of metal cations and at least one phosphate. Preferably, the at least one metal oxide or metal hydroxide comprises at least one clay, alumino-silicate clays being preferred. Preferably, in this embodiment the at least one clay comprises from about 10 to 40% by weight of the exterior coating. Preferably, the binder of the exterior coating composition further includes colloidal silica. Preferably, the colloidal silica comprises from about 5 to 30% by weight of the exterior coating.

Preferably, in this embodiment the at least one metal oxide or metal hydroxide is selected from the group consisting of alkali earth metal oxides, alkaline earth hydroxides, aluminum oxide, oxides of first row transition metals, hydroxides of first row transition metals, oxides of second row transition metals, and hydroxides of second row transition metals. More preferably, in this embodiment, the at least one metal oxide or metal hydroxide is selected from the group consisting of magnesium oxide, calcium oxide, iron oxide, copper oxide, zinc oxide, aluminum oxide, cobalt oxide, zirconium oxide and molybdenum oxide. Preferably, the at least one metal oxide or metal hydroxide is sparingly soluble in an acidic aqueous solution. In addition, it is preferred that the at least one metal oxide or metal hydroxide comprise from about 10 to 30% by weight of the exterior coating.

Preferably, in this embodiment, the at least one phosphate is selected from the group consisting of phosphoric acid and acid phosphate salts. More preferably, the at least phosphate is selected from the group consisting of phosphoric acid, and acid salts of phosphorous oxo anions, and especially salts including at least one cation selected from the group consisting of ammonium, calcium, sodium, potassium, and aluminum cations. In particular, it is preferred that the at least one phosphate be selected from the group consisting of phosphoric acid, ammonium hydrogen phosphate, ammonium dihydrogen phosphate, potassium hydrogen phosphate, potassium dihydrogen phosphate, potassium phosphate, calcium hydrogen phosphate, calcium dihydrogen phosphate, magnesium hydrogen phosphate, sodium hydrogen phosphate, sodium dihydrogen phosphate, aluminum hydrogen phosphate, aluminum dihydrogen phosphate, and mixtures thereof. Commercial grades of calcium phosphate salts, such "NSP" (normal super phosphate) and "TSP" (triple super phosphate) can also be used. Potassium dihydrogen phosphate ("monopotassium phosphate"), aluminum hydrophosphate ($AlH_3(PO_4).2H_2O$), monoaluminum phosphate ($Al(H_2PO_4)_3$) and magnesium dihydrogen phosphate are especially preferred. Preferably, the at least one phosphate comprises from about 10 to 60% by weight of the exterior coating.

Preferably, the relative proportion of the metal oxide or metal hydroxide and the phosphate is selected to provide a acid-base chemical cement having a generally neutral pH, such as a pH from about 5.5 to 8.5, more preferably from about 6 to 8.

In this aspect of roofing granules according to the present invention, the cure of the exterior coating composition depends on the composition of the chemically bonded cement. A broad range of cure conditions, ranging from rapid room temperature curing to low energy cures at moderately elevated temperatures to high energy cures at more elevated temperatures can be attained by varying the metal oxide or hydroxide and the phosphate. Optionally, the reactivity of the metal oxide or hydroxide can be reduced by calcining the metal oxide or metal hydroxide prior to preparing the binder. In addition, the pot life of the binder can be extended by the optional addition of a retardant such as boric acid.

Preferably, in this aspect of the roofing granules of the present invention, wherein the chemically bonded cement comprises from about 30 to 80 percent by weight of the exterior coating. Preferably, the at least one metal oxide or metal hydroxide comprises from about 10 to 30 percent by weight of the chemically bonded cement.

In the roofing granules of the present invention, the exterior coating composition preferably also includes at least one photocatalytic particulate. The at least one photocatalytic particulate of the exterior coating preferably has an average particle diameter less than about 100 nm. Preferably, the at least one photocatalytic particulate has an average particle size of from about 1 nm to about 60 nm, as determined by a light scattering method. In addition, it is preferred that the least one photocatalytic particulate comprises from about 0.1 to 20% by weight of the exterior coating. Preferably, the at least one photocatalytic particulate is photocatalytic metal oxide. Preferably the photocatalytic metal oxide is selected from the group consisting of photocatalytic titanium oxide, photocatalytic copper oxide, photocatalytic vanadium oxide, and photocatalytic zinc oxide. Photocatalytic titanium dioxide, and in particular anatase titanium dioxide, is especially preferred.

Preferably, the at least one photocatalytic particulate is selected to have high photoefficiency. In particular, the grain size and crystal phase of the particulate are preferably selected to enhance photoactivity. Further, the photocatalytic particulate preferably includes selected dopants to enhance photoactivity. For example, when the at least one photocatalytic particulate is nanocrystalline titanium dioxide, the particulate can be prepared as the anatase crystal phase, the particulate can be prepared as a mesoporous material, Fe(III), Nb(V), V(V) Pt and like dopants may be included, noble metal nanodomains may be included, the surface of the titanium dioxide can be treated to enhance diffusion of oxidizing species from the surface, and the like.

Preferably, the exterior coating composition is applied to the exterior surface of mineral core particles to form an exterior coating layer with a thickness of from about 5 micrometers to about 200 micrometers, and more preferably a thickness of from about 12.5 micrometers to about 40 micrometers.

The roofing granules of the present invention can be colored using conventional coatings pigments. The coatings pigments can be included in the outer layer, in the inner layer (in those embodiments of the present invention that employ an inner coating layer), or both the inner layer and the outer layer. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. The said roofing granules can also contain color pigments or additives that reflect solar radiation. Preferably, the color pigments or additives can reflect the near infrared radiation of solar spectrum, such that the solar heat absorption can be reduced without affecting the color.

In addition to the photocatalytic particulate, the roofing granules of the present invention can optionally include conventional algaecidal materials, such as zinc oxide, copper oxide, and mixtures thereof.

The proportion of algaecidal materials in the algae-resistant roofing granules can be adjusted depending on a number of factors, such as the intended use of the roofing products manufactured using the algae-resistant granules, the expected environmental conditions at the site where the roofing products including the algae-resistant granules are to be installed, the proportion of algaecidal materials in the algae-resistant granules, the proportion of algae-resistant roofing granules to conventional non-algae-resistant roofing granules employed in the roofing product, et al. In general, however, the proportion of algaecidal materials is preferably selected to provide algae-resistant roofing granules in which the algaecidal material comprises from about 0.005 to about 10 percent by weight of the granules.

The algae resistance properties of the roofing granules of the present invention are determined by a number of factors, including the porosity of the surface coating of the roofing granules, the nature and amount(s) of the algaecidal materials employed, and the spatial distribution of the algaecidal materials in the granules.

In one presently preferred embodiment, the base particles are prepared by providing inert core particles, and subsequently forming the base particles by coating the inert core particles with an inner coating composition to form an inner layer on the inert core particles. In this case, the inner coating composition optionally includes the at least one algaecidal material. The inner coating composition can also include colorants, such as metal oxide pigments, and other components, such as solar heat-reflective pigments.

The roofing granules of the present invention can be employed in the manufacture of roofing products, such as asphalt shingles, using conventional roofing production processes. Typically, bituminous roofing products are sheet goods that include a non-woven base or scrim formed of a fibrous material, such as a glass fiber mat. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The roofing granules of the present invention can be mixed with conventional roofing granules, and the granule mixture can be embedded in the surface of such bituminous roofing products using conventional methods. Alternatively, the roofing granules of the present invention can be substituted for conventional roofing granules in the manufacture of bituminous roofing products.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products.

The bituminous material used in manufacturing roofing products according to the present invention is derived from a petroleum processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, oils, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

The following example describes a typical formulation of the binder system and application of the coating of the present invention. Crushed rhyolite rock granules with particle size between #10 US mesh and #40 US mesh (CertainTeed Corp, Piedmont, Mo.) are used as the mineral core. A coating binder was prepared according to the formulation provided in Table 1 below, and applied to 400 g of rhyolite core particles by a conventional pan coating method to give a thickness of several microns. The coating included photocatalytic nano-titanium oxide particulate with a mean particle size of 40 nm, supplied as TiNano 40 anatase by Altair Nanomaterials, Inc., as an additive to provide photocatalytic functionality to the roofing granules. The colloidal silica solution Ludox CL-X (45% solids, pH 9.1) and aluminum phosphate ($AlPO_4$) were obtained from Aldrich Chemical Company, kaolin clay solution (70% solids) from Unimin Corporation and zinc oxide 902 from Zinc Corporation of America. The coated mineral cores were subsequently fired in a rotary kiln at either 600 degrees F. (316 degrees C.) in one instance or at 1,000 degrees F. (538 degrees C.) in another instance to give roofing granules according to the present invention.

TABLE 1

| Component | Weight (g) |
| --- | --- |
| Nano-$TiO_2$ | 3 |
| Silica solution | 15 |
| Aluminum phosphate | 4.5 |
| Kaolin clay | 10 |
| Zinc oxide | 4.5 |

The finished granules are embedded onto an asphalt coating on an aluminum support plate. A thin coating of red rhodamine 6G solution (40 mg/l in water) was sprayed onto these granules. After being air dried at room temperature, the color of these test panels was measured using a HunterLab calorimeter. The panels were then placed in a QUV accelerated weathering tester, Model QUV/Spray supplied by Q-Panel Lab Products, under an irradiance of 0.77 $W/m^2$/340 nm for various durations to determine the photocatalytic activity of the granules. The control is the standard colored granule without containing any photocatalytic particles. Changes in color as a function of exposure time are summarized in Table 2 below.

TABLE 2

| Exposure Time | Color Reading† | Control | Binder Fired at 600° F. | Binder Fired at 1,000° F. |
|---|---|---|---|---|
| 30 min. | Delta L* | 0.94 | 0.86 | 0.19 |
| | Delta a* | 0.20 | −2.94 | −2.29 |
| | Delta b* | −0.21 | 1.34 | 0.84 |
| 60 min. | Delta L* | 0.01 | 0.83 | 0.21 |
| | Delta a* | −0.93 | −3.48 | −2.86 |
| | Delta b* | 0.19 | 1.78 | 1.18 |
| 120 min. | Delta L* | 0.37 | 0.65 | −0.11 |
| | Delta a* | −1.05 | −6.04 | −4.45 |
| | Delta b* | 0.14 | 2.81 | 1.60 |
| 180 min. | Delta L* | 1.33 | 0.26 | −1.41 |
| | Delta a* | −1.34 | −7.67 | −5.10 |
| | Delta b* | 0.43 | 3.02 | 1.42 |

†Compared to the initial, unexposed test panels

The large decreases in the redness, i.e. the a* values, of test granules containing photocatalytic anatase titanium oxide show clearly the effect of anatase in decomposing the red organic rhodamine dye. The photocatalytic effect is also effective in destroying other organic compounds or microorganism including algae, fungi and mildew.

Furthermore, a simplified formulation is illustrated in a second example wherein the binder comprises a single component, a metal phosphate. In this case, 48 g of monoaluminum phosphate solution (FFB 705 from BassTech International, pH 2 and 50% solids) and 81 g of nano-titanium oxide dispersion (S5-300A from Millennium Chemicals, pH 1 and 20% solids) were applied to 400 g of crushed rhyolite rock via the pan coating method. The coated rock was then fired at 1,000 degrees F. (538 degrees C.) to produce coated roofing granules.

In a further example, combinations of various binder components were subjected to a boiling test was used to determine how well the binder holds the pigment together (pigment fixation test). The results are expressed in term of percent pigment loss. A high percent pigment loss suggests a weak binder. The compositions and results are shown in Table 3 below:

TABLE 3

| Aluminum phosphate | Colloidal silica | Clay | Zinc oxide | Pigment | Pigment loss (Wt. percent) |
|---|---|---|---|---|---|
| X | X | X | X | X | 1.24 |
| X | X | X | | X | 0.61 |
| X | X | | | X | 0.66 |
| X | | | X | X | 1.06 |

These data indicate that combinations of colloidal silica, clay, and/or zinc oxide with aluminum phosphate can lead to stronger binders.

Various modifications can be made in the details of the various embodiments of the processes, compositions and articles of the present invention, all within the scope and spirit of the invention and defined by the appended claims.

We claim:

1. Algae-resistant roofing granules comprising:
a mineral core; and an exterior coating covering the mineral core;
wherein the exterior coating comprises a binder, the binder comprising clay, colloidal silica, at least one phosphate, and at least one metal oxide, and at least one photocatalytic particulate dispersed in the binder; the at least one photocatalytic particulate having an average particle size less than about 100 nm.

2. Algae-resistant roofing granules according to claim 1, wherein the clay comprises from about 20 to 40% by weight of the exterior coating.

3. Algae-resistant roofing granules according to claim 1, wherein the colloidal silica comprises from about 25 to 60% by weight of the exterior coating.

4. Algae-resistant roofing granules according to claim 1, wherein the at least one phosphate comprises from about 5 to 30% by weight of the exterior coating.

5. Algae-resistant roofing granules according to claim 1, wherein the at least one photocatalytic particulate is a metal oxide comprising from about 0.1 to 20% by weight of the exterior coating.

6. Algae-resistant roofing granules according to claim 1, wherein the at least one photocatalytic particulate is selected from the group consisting of photocatalytic titanium oxide, photocatalytic copper oxide, photocatalytic vanadium oxide, and photocatalytic zinc oxide.

7. Algae-resistant roofing granules according to claim 1, wherein the at least one phosphate is selected from the group consisting of salts of phosphorous oxo anions.

8. A roofing shingle comprising algae-resistant roofing granules according to claim 1.

9. A process for making roofing granules resistant to algal growth, the process comprising:
(a) combining clay, at least one phosphate, at least one metal oxide, and at least one photocatalytic particulate to form an exterior coating composition, the at least one photocatalytic particulate having an average particle size less than about 100 nm;
(b) applying the coating composition to an aggregate material having an exterior surface, so that the exterior surface is coated at least in part by the exterior coating composition to form coated aggregate; and
(c) curing the exterior coating composition to form a photocatalytic coating on the aggregate material,
wherein the exterior coating composition further comprises colloidal silica.

10. A process according to claim 9, wherein the at least one phosphate comprises from about 20 to 80% by weight of the exterior coating composition.

11. A process according to claim 9, wherein the at least one photocatalytic particulate has an average particle size of about from 1 nm to 60 nm, as determined by a light scattering method.

12. A process according to claim 9, wherein the at least one metal oxide is selected from the group consisting of alkali earth metal oxides, oxides of first row transition metals, and oxides of second row transition metals.

13. A process according to claim 9, wherein the at least one phosphate is selected from the group consisting of salts of phosphorous oxo anions.

14. A process according to claim 13, wherein the at least one phosphate is selected from the group consisting of aluminum phosphate, potassium phosphate, potassium hydrogen phosphate, potassium dihydrogen phosphate, calcium phosphate, calcium hydrogen phosphate, calcium dihydrogen phosphate, magnesium phosphate, magnesium hydrogen phosphate, sodium phosphate, sodium hydrogen phosphate, and sodium dihydrogen phosphate.

15. Algae-resistant roofing granules comprising:
a mineral core; and
an exterior coating covering the mineral core;
wherein the exterior coating comprises a chemically bonded phosphate cement and at least one photocatalytic particulate, and
wherein the exterior coating further comprises colloidal silica.

16. Algae-resistant metal granules according to claim 15, wherein the exterior coating further comprises at least one clay.

17. Algae-resistant roofing granules according to claim 15, wherein the at least one photocatalytic particulate has an average particle size of from about 1 nm to about 60 nm, as determined by a light scattering method.

18. Algae-resistant roofing granule according to claim 15 wherein the chemically bonded phosphate cement comprises at least one acid phosphate selected from the group consisting of phosphoric acid, and acid salts of phosphorous oxo anions.

19. Algae-resistant roofing granules according to claim 15 wherein the chemically bonded cement comprises at least one basic metal oxide or metal hydroxide and at least one acid phosphate.

20. Algae-resistant roofing granule according to claim 19 wherein the at least one acid phosphate is selected from the group consisting of phosphoric acid, and acid salts of phosphorous oxo anions.

21. Algae-resistant roofing granules according to claim 20 wherein the at least one acid phosphate is selected from the group consisting of phosphoric acid, ammonium hydrogen phosphate, ammonium dihydrogen phosphate, potassium hydrogen phosphate, potassium hydrogen phosphate, potassium dihydrogen phosphate, calcium hydrogen phosphate, calcium dihydrogen phosphate, magnesium hydrogen phosphate, sodium hydrogen phosphate, sodium dihydrogen phosphate, aluminum hydrogen phosphate, aluminum dihydrogen phosphate, and mixtures thereof.

* * * * *